ized Patent (12) United States Patent  
Chung et al.

(10) Patent No.: US 8,321,091 B2  
(45) Date of Patent: Nov. 27, 2012

(54) BACKWARD MOTION CONTROL METHOD FOR A CAR CONNECTED TO AT LEAST ONE TRAILER

(75) Inventors: Woo Jin Chung, Seoul (KR); Kwang Hyun Yoo, Gunpo-si (KR); Jae Il Roh, Ansan-si (KR); Myoung Kuk Park, Seoul (KR)

(73) Assignee: Korean University Research and Business Foundation, Seoul (KR)

( * ) Notice: Subject to any disclaimer, the term of this patent is extended or adjusted under 35 U.S.C. 154(b) by 193 days.

(21) Appl. No.: 12/823,190

(22) Filed: Jun. 25, 2010

(65) Prior Publication Data

US 2011/0160956 A1    Jun. 30, 2011

(30) Foreign Application Priority Data

Dec. 31, 2009   (KR) .................. 10-2009-0135578

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2006.01) |
| *G08B 21/00* | (2006.01) |

(52) U.S. Cl. ........................................ 701/41; 340/431
(58) Field of Classification Search ................... 701/41; 340/431; 303/146–147; 180/168–170
See application file for complete search history.

(56) References Cited

U.S. PATENT DOCUMENTS

| 6,292,094 B1 * | 9/2001 | Deng et al. .................... 340/431 |
| 7,142,098 B2 * | 11/2006 | Lang et al. .................... 340/431 |
| 2007/0090688 A1 * | 4/2007 | Haemmerling et al. .......... 303/7 |

* cited by examiner

*Primary Examiner* — Thomas Tarcza
*Assistant Examiner* — Kevin Myhre
(74) *Attorney, Agent, or Firm* — NSIP Law (57) ABSTRACT

Provided is a backward motion control technology for a car. The car comprises a backward-motion control terminal, a control signal converter, and a backward-motion controller. The backward-motion control terminal outputs a first backward-motion control signal corresponding to a backward velocity and a backward direction of the last trailer according to a user's operation. The control signal converter converts the first backward-motion control signal to a second backward-motion control signal which corresponds to a backward velocity and a backward direction of the car. The backward-motion controller controls the car based on the second backward-motion control signal so that the last trailer moves backward by the backward velocity and the backward direction corresponding to the first backward-motion controlling signal.

8 Claims, 9 Drawing Sheets

BACKWARD MOTION CONTROL METHOD FOR A CAR CONNECTED TO AT LEAST ONE TRAILER

CROSS-REFERENCE TO RELATED APPLICATION(S)

This application claims the benefit under 35 U.S.C. §119(a) of Korean Patent Application No. 10-2009-0135578, filed on Dec. 31, 2009, the entire disclosure of which is incorporated herein by reference for all purposes.

BACKGROUND

1. Field

The following description relates to a car connected to at least one trailer and a backward-motion control method, more particularly, to a car connected to at least one trailer and a backward-motion control method for controlling the backward motion of the car and the trailer in the same way as a forward-motion control.

2. Description of Related Art

A passive trailer system is a useful transport mechanism, which can improve a transport capacity in spite of using only one powered car. The passive trailer system is used in every-day living or in the field of a transport industry, such as an articulated bus, a boat trailer, a camping trailer, an airport luggage carrier, or a multiple trailer truck.

However, it is not easy to control the passive trailer system because the control of the passive trailer system has a complicated non-linear problem. Also, it is difficult for an unskilled driver to drive the passive trailer system because control of the passive trailer system becomes more difficult as the number of a connected trailer increases. Particularly, a backward-motion control of the passive trailer system is recognized as a more difficult problem because the backward-motion control is influenced by an angle between the car and the trailer.

For solving the problem of the passive trailer system, a study about a soft computing method, a motion control of the passive trailer system, or a motion mechanism of the passive trailer system is actively performed.

However, there is a limit that said studies cannot provide a driver with a direct solution because the driving of the passive trailer system is dependent on a handling of the driver.

SUMMARY

Accordingly, in one general aspect, there is provided a car connected to at least one trailer and a backward-motion control method for easily controlling the backward motion of the car and the trailer in the same ways as a forward-motion control.

In accordance with an aspect of the present invention, there is provided a car connected to at least one trailer.

The car comprises a driving part a backward-motion control terminal, a control signal converter, and a backward-motion controller. The driving part controls a velocity and a direction of the car. The backward-motion control terminal outputs a first backward-motion control signal corresponding to a backward velocity and a backward direction of the last trailer according to a user's operation. The control signal converter converts the first backward-motion control signal to a second backward-motion control signal which corresponds to backward velocity and a backward direction of the car and makes the last trailer move backward as the backward velocity and the backward direction corresponding to the first backward-motion control signal, The backward-motion controller controls the driving part on the basis of the second backward-motion control signal so that the last trailer moves backward by the backward velocity and the backward direction corresponding to the first backward-motion controlling signal.

The first backward-motion control signal may comprise a first linear velocity and a first angular velocity for the last trailer; and the second backward-motion control signal may comprise a second linear velocity and a second angular velocity corresponding to a backward-motion of the car.

The controlling signal converter-part may convert the first backward-motion control signal to the second backward-motion control signal by a following equation;

$$A \begin{bmatrix} (-1)^{n-1}\cos\Psi_n & (-1)^{n-1}d_{car}\sin\Psi_n \\ \dfrac{\sin\Psi_n}{d_{trailer}} & -\cos\Psi_n \end{bmatrix} \begin{bmatrix} v_0 \\ w_0 \end{bmatrix} = \begin{bmatrix} v_n \\ w_n \end{bmatrix}$$

$$A = \dfrac{1}{(-1)^{n-1}\left(\cos^2\Psi_n + \dfrac{d_{car}}{d_{trailer}}\sin^2\Psi_n\right)},$$

$$\Psi_i = \sum_{k=1}^{i}(-1)^{k-1}(\theta_{k-1}-\theta_k), i=1,\ldots,n$$

(herein, $v_0$ is a linear velocity of the car, $W_0$ is an angular velocity of the car, $v_n$ is a linear velocity of the nth trailer, $w_n$ is an angular velocity of the nth trailer, $\theta_i$ is a joint angle between the ith trailer and the i-1th trailer or between the car and the first trailer, $d_{car}$ is a length of a connecting link of the car, and $d_{trailer}$ is a length of a connecting link of the trailer.)

The car may further comprise an angle sensor part for measuring the joint angle.

The controlling signal converter-part may convert from the first backward controlling signal to the second backward controlling signal on the basis of the joint angle measured in the angle sensor part.

The car may further comprise a camera installed the last trailer and a display part installed the car. Here, the camera may capture the rear of the last trailer and the display part displays images captured by the camera.

The backward-motion control terminal may transmit the first backward-motion control signal by wireless.

The car may further comprise a control mode selecting part selecting one of a backward-motion control mode and a forward-motion control mode.

The backward-motion controller may control the control signal converter to convert the first backward-motion control signal to the second backward-motion control signal and controls the driving part on the basis of the second backward-motion control signal so that the car moves backward, when the backward-motion control mode is selected by the control mode selecting part; and the backward-motion controller may prevent the control signal converter from converting process and controls the driving part on the basis of the first backward-motion control signal so that the car moves forward, when the forward-motion control mode is selected by the control mode selecting part.

In accordance with another aspect of the present invention, there is provided a backward motion control method of the car connected to at least one trailer, the method comprising (a) inputting a first backward-motion control signal corresponding to at least one of a backward velocity and a backward direction of the last trailer; (b) converting the first backward-motion control signal to a second backward-motion control signal corresponding to at least one of a backward velocity and a backward direction of the car which makes the last trailer move backward as at least one of the backward velocity and the backward direction corresponding to the first backward-motion control signal; and (c) controlling the car to move backward on the basis of the second backward-motion control signal so that the last trailer moves backward at the backward velocity and/or the backward direction corresponding to the first backward-motion control signal.

The first backward-motion control signal may comprise a first linear velocity and a first angular velocity of the last trailer and the second backward-motion control signal may comprise a second linear velocity and a second angular velocity for the last trailer.

The first backward-motion control signal may be converted to the second backward-motion control signal in said step (b) by a following equation;

$$A \begin{bmatrix} (-1)^{n-1}\cos\Psi_n & (-1)^{n-1}d_{car}\sin\Psi_n \\ \dfrac{\sin\Psi_n}{d_{trailer}} & -\cos\Psi_n \end{bmatrix} \begin{bmatrix} v_0 \\ w_0 \end{bmatrix} = \begin{bmatrix} v_n \\ w_n \end{bmatrix}$$

$$A = \dfrac{1}{(-1)^{n-1}\left(\cos^2\Psi_n + \dfrac{d_{car}}{d_{trailer}}\sin^2\Psi_n\right)},$$

$$\Psi_i = \sum_{k=1}^{i} (-1)^{k-1}(\theta_{k-1} - \theta_k), i = 1, \ldots, n$$

(herein, $v_0$ is a linear velocity of the car, $W_0$ is an angular velocity of the car, $v_n$ is a linear velocity of the nth trailer, $w_n$ is an angular velocity of the nth trailer, $\theta_i$ is a joint angle between the ith trailer and the i-1th trailer or between the car and the first trailer, $d_{car}$ is a length of a connecting link of the car, and $d_{trailer}$ is a length of a connecting link of the trailer.)

The method may further comprise (d) measuring a joint angle of each trailer; and the first backward-motion control signal may be converted to the second backward-motion control signal in said step (b) on the basis of the measured joint angle.

The method may further comprise (e) selecting a backward-motion control mode or a forward-motion control mode; said step (b) and said step (c) are performed when the backward-motion control mode is selected in said step (e); and the car may be controlled to move forward on the basis of the first backward-motion control signal in the state that said step (b) and said step (c) may be prevented from being performed when the forward-motion control mode is selected in said step (e).

Other features and aspects will be apparent from the following detailed description, the drawings, and the claims.

According to an aspect of the present invention, a backward-motion control of a car and a trailer is performed through a forward-motion control using a backward-motion control terminal during the backward-motion control, such as reverse parking, in the state that the trailer is connected to a rear of the car. Accordingly, a driver can easily reverse the car and the trailer.

When the backward-motion control terminal transmits a first backward-motion control signal by wireless, the driver may easily reverse the car and the trailer as if the driver gets in the trailer and drives the trailer.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
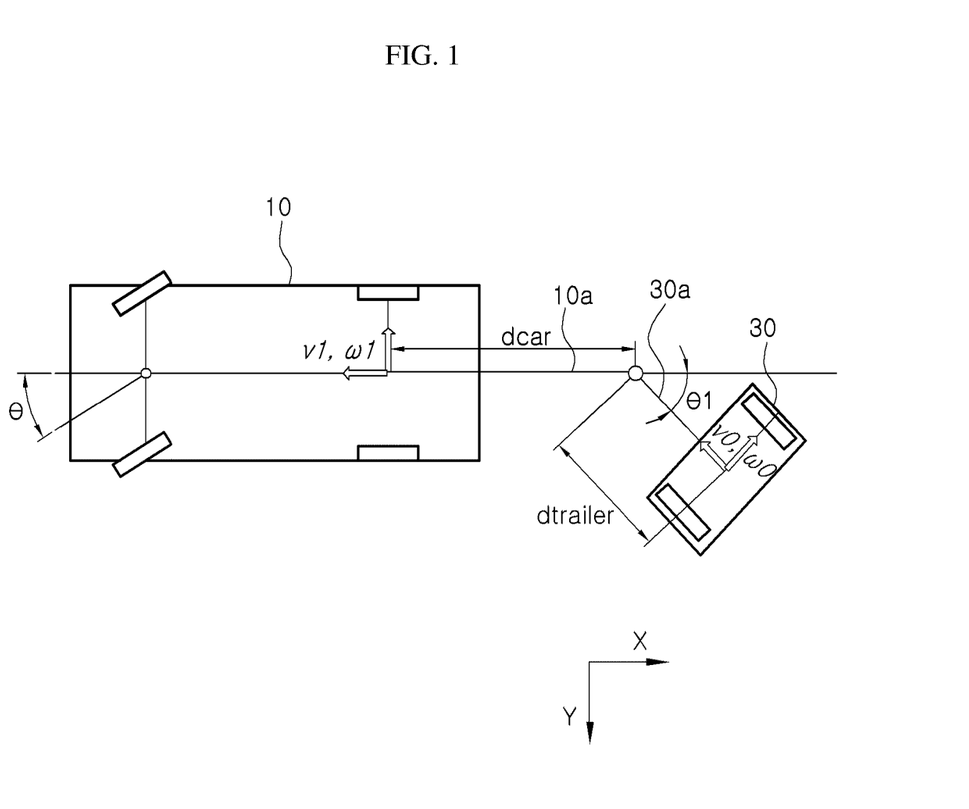
FIG. 1 is a diagram illustrating an example of a car connected to a trailer.
Figure 2:
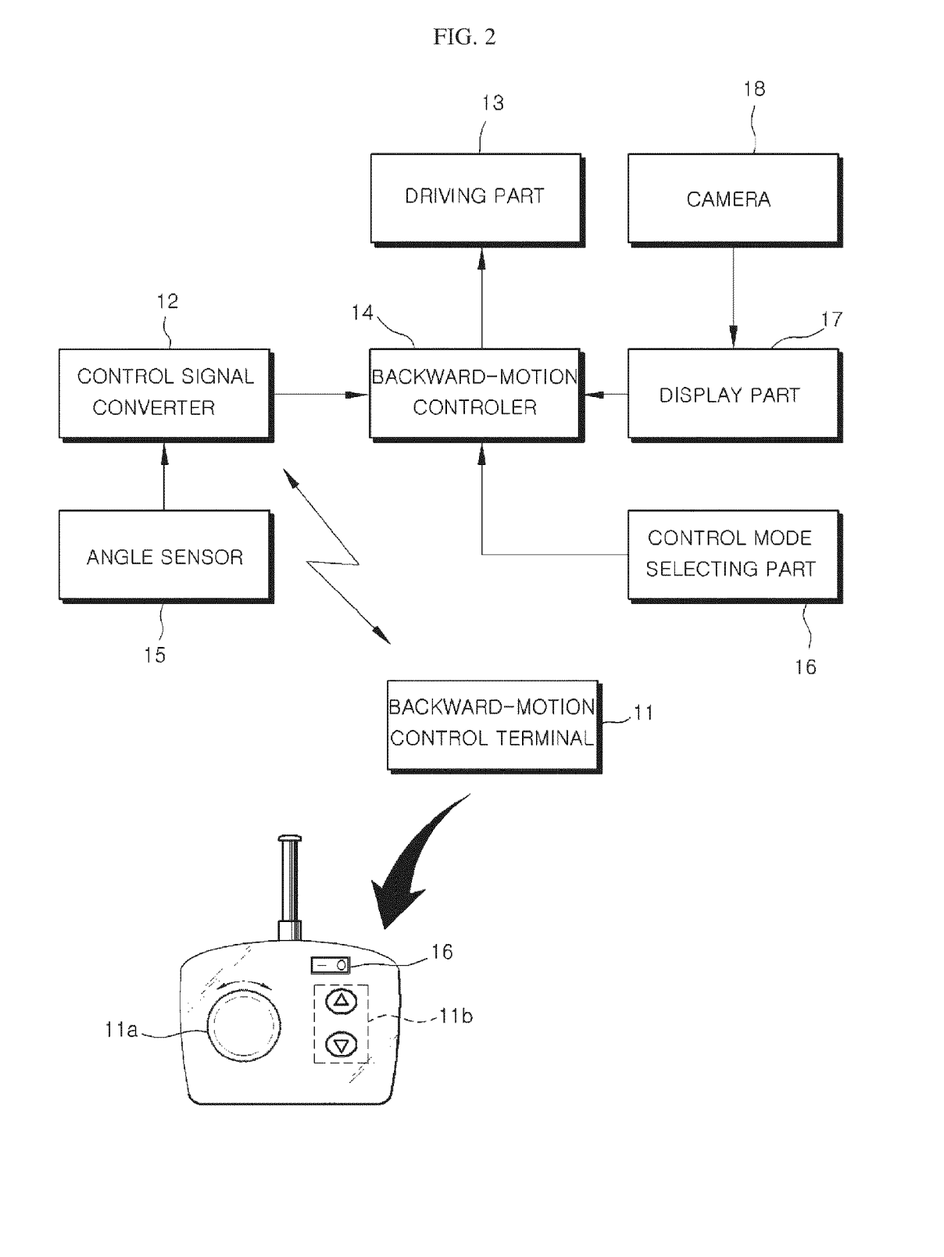
FIG. 2 is a diagram illustrating an example of a car according to an embodiment of the present invention.

FIG. 1 illustrates a car connected to one trailer. FIG. 2 illustrates an example of a car according to an embodiment of the present invention.

As shown in FIG. 1 and FIG. 2, a car 10 according to an embodiment of the present invention comprises a driving part 13, a backward-motion control terminal 11, a control signal converter 12 and a backward-motion controller. Here, as shown in FIG. 2, the car 10 is provided with a four-wheel and bi-axial type and connected a trailer 30 at the rear as an example.

The driving part 13 operates for controlling a direction and a velocity of the car 10. The driving part 13 may comprises a driving means such as a motor or an engine, and a steering means such as a wheel and a handle.

The backward-motion control terminal 11 generates and outputs a first backward-motion control signal according to a driver's operation. Here, the first backward-motion control signal is generated corresponding to a backward direction and a backward velocity of the trailer 30. It is not that the driver performs a backward-motion control of the car 10 but that the driver controls the car 10 in the same way as a forward-motion control of the trailer 30 by the backward-motion control terminal 11.

The backward-motion control terminal 11 may separate from the car 10, so that the driver can control the backward-motion control terminal 11 at the outside of the car 10 or in the state of getting in the trailer 30.

For example, the backward-motion control terminal 11 may transmit the first backward-motion control signal by wireless, as shown in FIG. 2. Referring to FIG. 2, the backward-motion control terminal 11 may include a jog shuttle 11a for handling a direction and a moving lever 11b for moving the car 10. Therefore, the driver handles the jog shuttle 11a of the backward-motion control terminal 11 as steering of the car 10 and handles the moving lever 11b of the backward-motion control terminal 11 as handling an accelerator of the car 10. At this time, the backward-motion control terminal 11 generates the first backward-motion control signal corresponding to driver's handling.

Meanwhile the control signal converter 12 converts the first backward-motion control signal transmitted from the backward-motion control terminal 11 to the second backward-motion control signal. Here, the second backward-motion control signal is converted corresponding to a backward direction and a backward velocity of the car 10, which makes the trailer 30 move backward by the backward velocity and the backward direction corresponding to the first backward-motion control signal.

That is, when the driver handles the backward-motion control terminal 11 as the driver drives the trailer 30, the backward-motion control terminal 11 generates the first backward-motion control signal. And then, the control signal converter 12 converts the first backward-motion control signal to the second backward-motion control signal for driving the car 10.

Referring to FIG. 1, the relations between a linear velocity and an angular velocity of the car 10 and a linear velocity and an angular velocity of the trailer 30 may be represented as an equation 1.

$$\begin{bmatrix} v_0 \\ w_0 \end{bmatrix} = \begin{bmatrix} \cos\theta_1 & d_{car}\sin\theta_1 \\ \dfrac{1}{d_{trailer}}\sin\theta_1 & -\cos\theta_1 \end{bmatrix} \begin{bmatrix} v_1 \\ w_1 \end{bmatrix} \quad \text{[Equation 1]}$$

In the equation 1, $v_0$ is the linear velocity of the car 10, and $W_0$ is the angular velocity of the car 10. Also, $v_1$ is the linear velocity of the trailer 30, and $w_1$ is the angular velocity of the trailer 30. Also, as shown in FIG. 1, $d_{car}$ is a length of a connecting link 10a of the car 10 for connecting the trailer 30, and $d_{trailer}$ is a length of a connecting link 30a of the trailer 30 which is rotatably connected to the connecting link 10a of the car 10. Also, $\theta_1$ is a joint angle between the trailer 30 and the car 10.

Here, a control value which is inputted the car 10 for moving the trailer, that is, the second backward-motion control signal is computed by the reverse function of the equation 1, which may be represented as an equation 2.

$$\left( \dfrac{1}{\cos^2\theta_1 + \dfrac{d_{car}}{d_{trailer}}\sin^2\theta_1} \right) \begin{bmatrix} \cos\theta_1 & d_{car}\sin\theta_1 \\ \dfrac{1}{d_{trailer}}\sin\theta_1 & -\cos\theta_1 \end{bmatrix} \quad \text{[Equation 2]}$$

$$\begin{bmatrix} v_0 \\ w_0 \end{bmatrix} = \begin{bmatrix} v_1 \\ w_1 \end{bmatrix}$$

Here, the control signal converter 12 converts the first backward-motion control signal to the second backward-motion control signal by using the equation 2.

Figure 3:
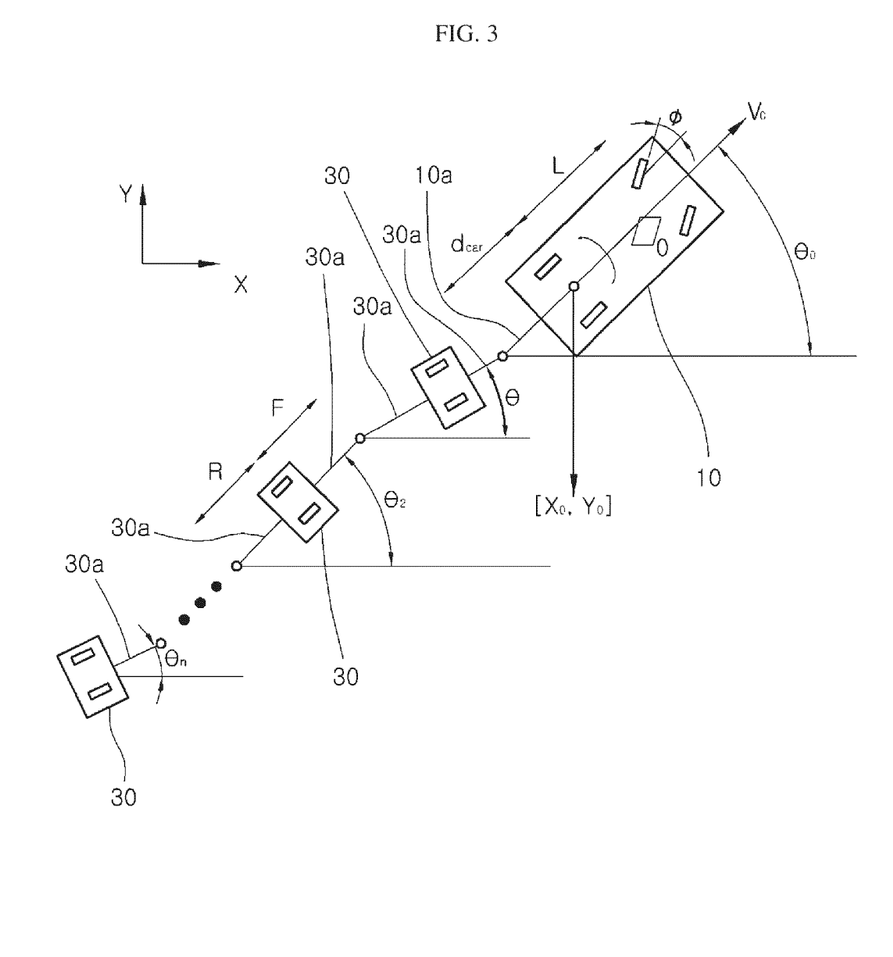
FIG. 3 is a diagram illustrating a car connected to a plurality of trailers.

Meanwhile, FIG. 3 is an example of a plurality of the trailer 30 connected to the car 30 one after another. The relation of the velocity between the car 10 and the plurality of the trailers 30 as shown FIG. 3 may be represented as an equation 3.

$$\begin{bmatrix} v_0 \\ w_0 \end{bmatrix} = \begin{bmatrix} \cos\Psi_n & (-1)^{n-1}d_{car}\sin\Psi_n \\ \dfrac{\sin\Psi_n}{d_{trailer}} & -(-1)^{n-1}\cos\Psi_n \end{bmatrix} \begin{bmatrix} v_n \\ w_n \end{bmatrix} \quad \text{[Equation 3]}$$

$$\Psi_i = \sum_{k=1}^{i} (-1)^{k-1}(\theta_{k-1} - \theta_k), \ i = 1, \ldots, n$$

In the equation, $v_0$ is the linear velocity of the car 10, $W_0$ is the angular velocity of the car 10, $v_n$ is the linear velocity of the nth trailer, $w_n$ is the angular velocity of the nth trailer, $\theta_i$ is the joint angle between the ith trailer and the i-1th trailer or between the car and the first trailer, $d_{car}$ is the length of the connecting link 10a of the car for connecting the first trailer 30, and $d_{trailer}$ is the length of the connecting link 30a of the trailer 30. Here, it is assumed that each length of the connecting links 30a connecting between the trailers 30 are same.

Here, an equation 4 which is the reverse function of the equation 3 may be represented as follow.

$$A \begin{bmatrix} (-1)^{n-1}\cos\Psi_n & (-1)^{n-1}d_{car}\sin\Psi_n \\ \dfrac{\sin\Psi_n}{d_{trailer}} & -\cos\Psi_n \end{bmatrix} \begin{bmatrix} v_0 \\ w_0 \end{bmatrix} = \begin{bmatrix} v_n \\ w_n \end{bmatrix} \quad \text{[Equation 4]}$$

$$A = \dfrac{1}{(-1)^{n-1}\left( \cos^2\Psi_n + \dfrac{d_{car}}{d_{trailer}}\sin^2\Psi_n \right)},$$

$$\Psi_i = \sum_{k=1}^{i} (-1)^{k-1}(\theta_{k-1} - \theta_k), \ i = 1, \ldots, n$$

As described above, in case that the plurality of the trailers 30 are connected to the rear of the car 10, the control signal converter 12 converts the first backward-motion control signal to the second backward-motion control signal by the equation 4. Here, the first backward-motion control signal comprises the first linear velocity and the first angular velocity for the last trailer 30, and the second backward-motion control signal comprises the second linear velocity and the angular velocity for the backward driving the car 10.

Here, the car 10 according to an embodiment of the present invention may comprise an angle sensor 15 measuring the joint angle $\theta_i$. The angle sensor 15 is provided at the joint between trailers 30 or between the trailer 30 and the car 10, and measures the joint angle $\theta_i$ between trailers 30 or between the trailer 30 and the car 10.

And then, the control signal converter 12 converts the first backward-motion control signal to the second backward-motion control signal on the basis of the joint angle $\theta_i$ measured by the angle sensor 15.

As the example method described above, the first backward-motion control signal is converted to the second backward-motion control signal, and then the backward-motion controller 14 controls the driving part 13 according to the second backward-motion control signal so that the car is reversed. At this time, the car 10 is reversed according to the second backward-motion control signal, and then the trailer 30 is reversed according to the velocity and the direction corresponding to the first backward-motion control signal, that is, the velocity and the direction for the trailer 30 determined by handling of the backward-motion control terminal 11.

Thus, if the driver handles the backward-motion control terminal 11 like as if the driver drives the trailer 30 intuitively, the trailer 30 is reversed as the driver's intention by the backward driving of the car 10 according to the driver's handling.

Meanwhile, the car 10 according to an embodiment of the present invention may comprise a camera 18 and a display part 17, as shown in FIG. 2. Here, the camera 18 is installed at the last trailer 30, and captures the rear of the last trailer 30. And, the backward-motion controller 14 displays images captured by the camera 18 at a screen of the display part 17.

Therefore, a driver checks the rear of the last trailer 30 by the screen of the display part 17 and handles the backward-motion control terminal 11. Thus, the driver may have no use for moving to the rear of the trailer 30 for the backward-motion control.

Also, as shown in FIG. 2, the car 10 according to an embodiment of the present invention may comprise a control mode selecting part 16 selecting one of a forward-motion control mode and a backward-motion control mode. In FIG. 2, the control mode selecting part 16 is installed at the backward-motion control terminal 11, as an example.

Here, when the driver selects the backward-motion control mode by using the control mode selecting part 16, the control signal converter 12 converts the first backward-motion control signal to the second backward-motion control signal, and the backward-motion controller 14 controls the driving part 13 on the basis of the second backward-motion control signal so that the car 10 is reversed.

On the other hand, when the driver selects the forward-motion control mode by using the control mode selecting part 16, the backward-motion controller 14 prevents the control signal converter 12 from converting process. That is, the control signal converter 12 does not convert the first backward-motion control signal to the second backward-motion control signal in the state of the forward-motion control mode.

And the backward-motion controller 14 controls the driving part 13 on the basis of the first backward-motion control signal so that the car 10 moves forward. Therefore, in case that it is necessary to drive the car forward during the process of the backward-motion control mode, the driver selects the backward-motion control mode or the forward-motion control mode through the control mode selecting part 16, and then the driver can drive the car 10 forward or backward only through the backward-motion control terminal 11. Thus, the driver does not need to get in the car 10 for the forward-motion control of the car 10 during the backward-motion control of the trailer 30 at the outside of the car 10.

For experimental verification of the backward-motion control of the car 10 according to an embodiment of the present invention, a simulation test is conducted by using a Matlab-based program. And it is assumed that the length of $d_{car}$ and $d_{trailer}$ of the car 10 and trailer 30 is same.

Figure 4:
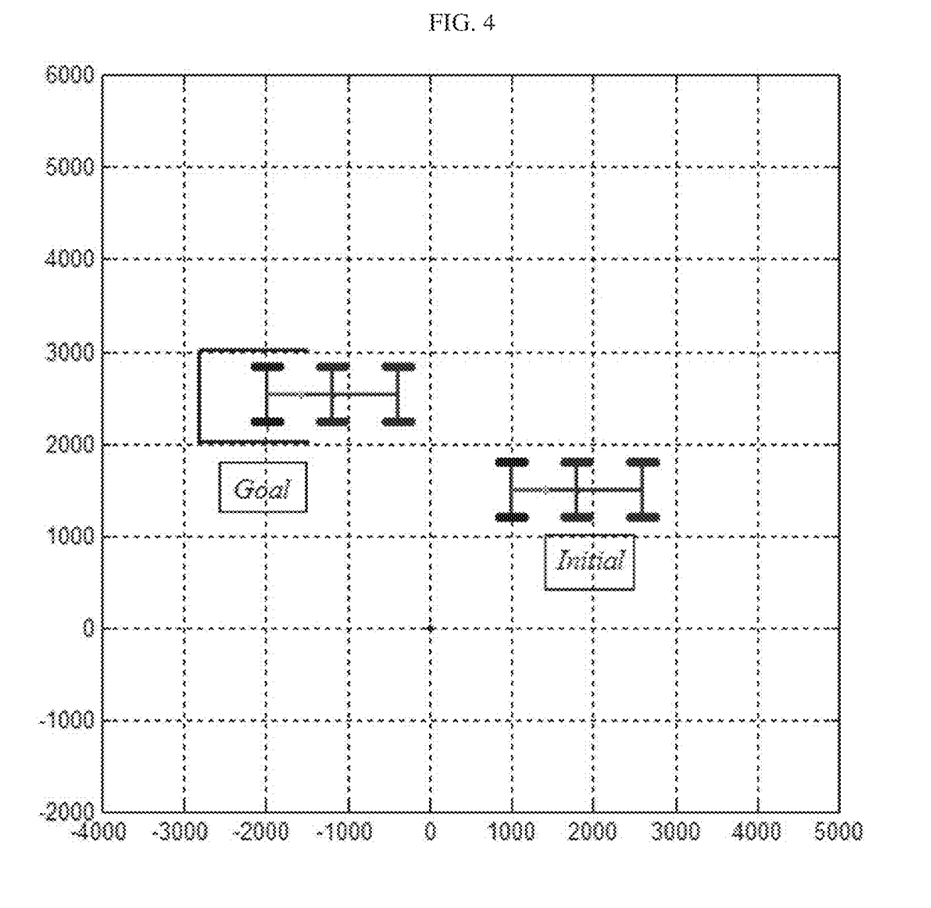
FIGS. 4-9 are diagrams for explaining the results of experiments to compare a backward-motion control method of the car according to an embodiment of the present invention and the traditional method.

As shown in FIG. 4, the time from "Initial" point to "Goal" point is measured about the backward control method according to an embodiment of the present invention and the traditional backward control method, respectively.

In case of traditional backward-motion control method, the driver controls a handle of a car for the backward-motion control. Therefore, it is not intuitive about the motion of the trailer 30 at the head of the driving direction of the last trailer 30. On the other hand, as shown in FIG. 2 as an example of a backward-motion control terminal 11, the backward-motion control method according to an embodiment of the present invention is intuitively able to input control inputs of the left turn, the right turn, the forward motion and/or the backward motion. Also, a constant velocity $v_1$ to the forward direction of the trailer 30 is inputted in the backward-motion control of the test. And the constant $v_1$ and $w_1$ is inputted during turning.

Figure 5:
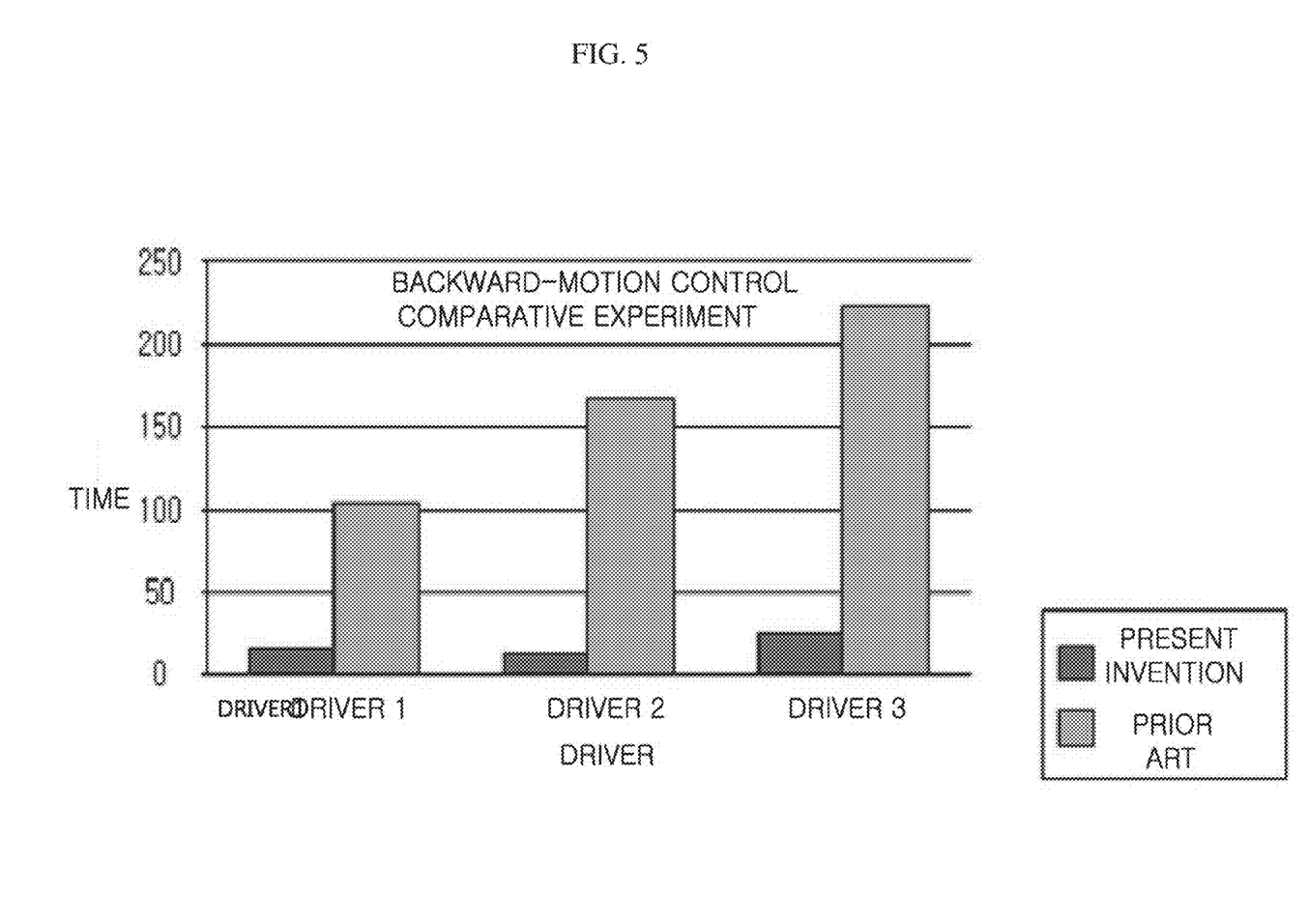

In that condition, the test is conducted by three experienced driver having a driver's license. And, if the test time is over 10 minutes, the test is determined as failure. FIG. 5 shows the test result.

The analysis result of the test is that the drive of trailer 30 is hard, the possibility of failure is high, and the test results are different among individuals. On the other hand, in case that the backward-motion control method according to an embodiment of the present invention is applied, it can be ascertained that the driving control of the trailer 30 is easy and the driver without a driver's license for the trailer 30 can control the trailer 30.

Figure 6:
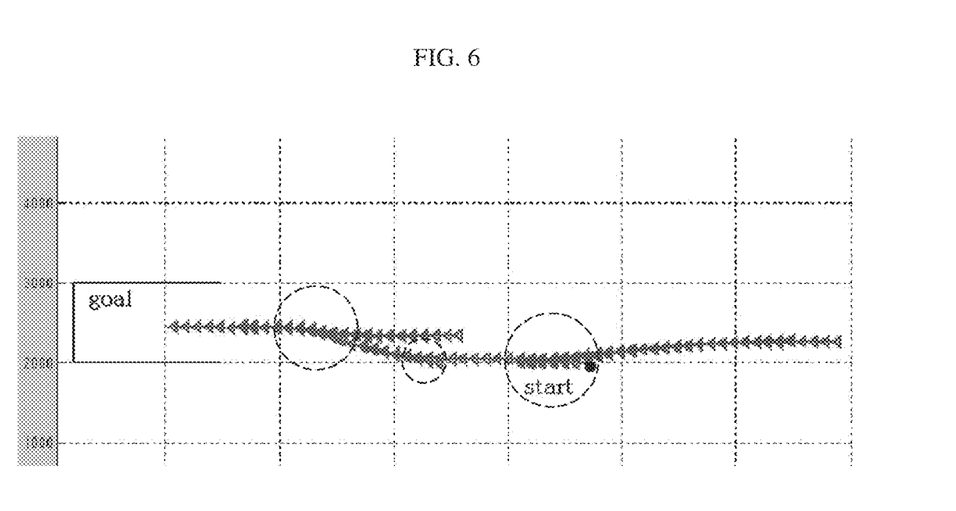
Figure 7:
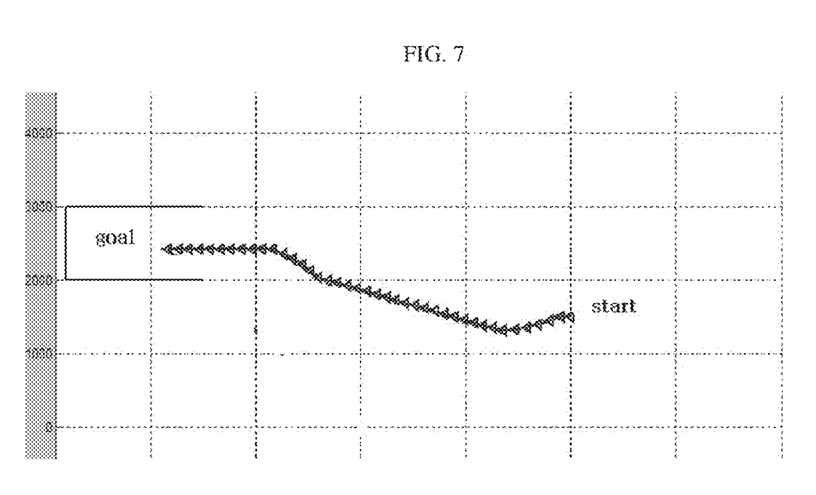

FIG. 6 shows a center of a wheelbase of the car 10 in the backward-motion control method according to the traditional backward-motion control method, and FIG. 7 shows a center of a wheelbase of the car 10 in the backward-motion control method according to an example embodiment of the present invention. FIG. 6 shows the pattern that the direction of the car 10 is adjusted during the forward movement for parallelizing the direction of the car 10 with the destination and then the car 10 is reversed. And the car 10 moves forward and backward about three times for correcting the course for preventing the car 10 from moving a wrong course. That is confirmed by the circle part in FIG. 6.

On the other hand, in case that the backward-motion control method according to an embodiment of the present invention, the driving can be completed without course correction. Thus, it can be ascertained that the backward-motion control method according to an embodiment of the present invention is effective in time and driving.

Figure 8:
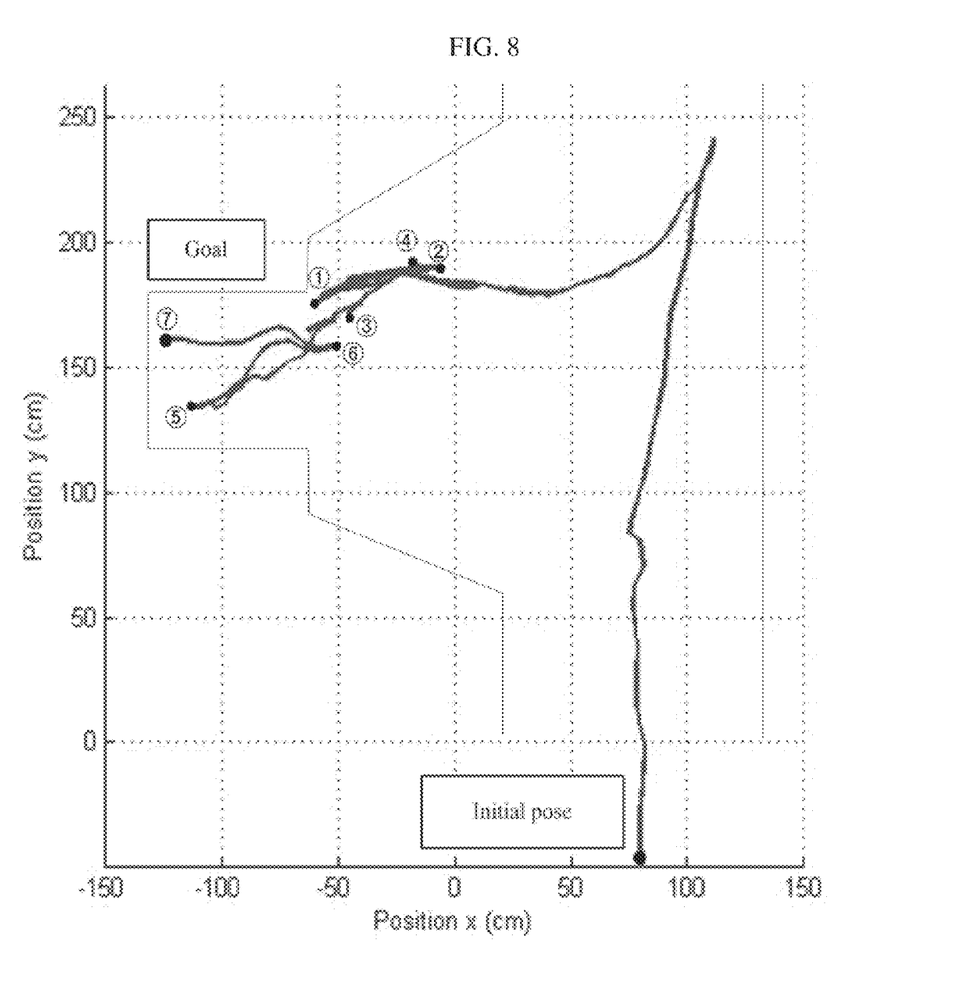
Figure 9:
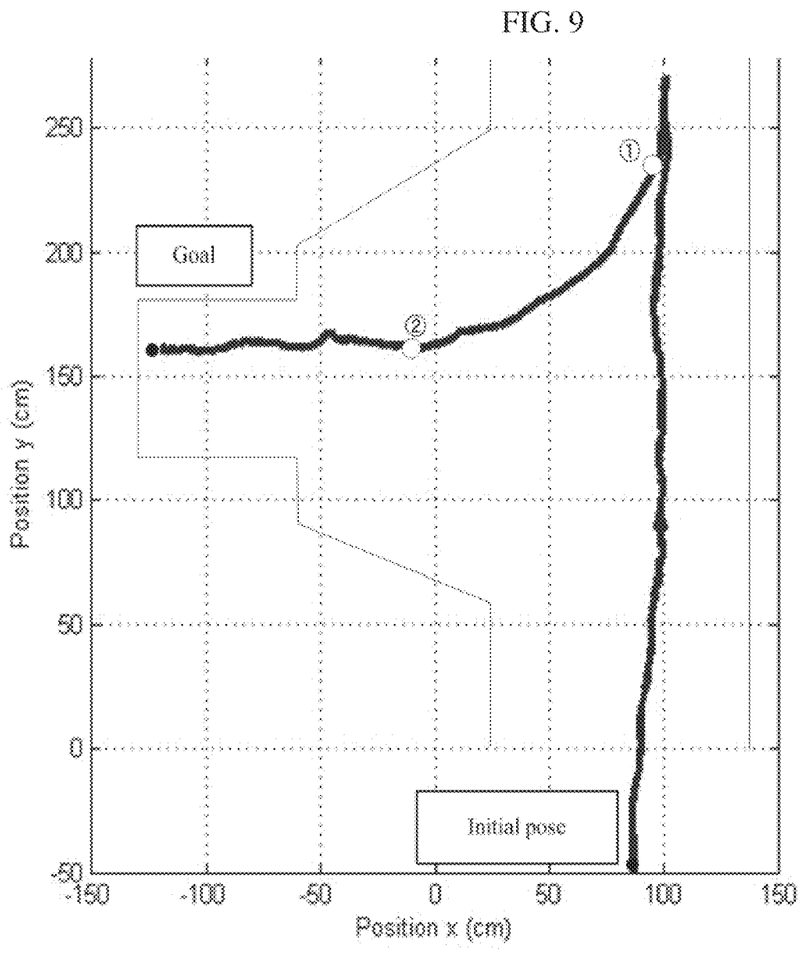

FIG. 8 shows a center of a wheelbase of the car 10 in the backward-motion control method according to the traditional backward-motion control method, and FIG. 9 shows a center of the wheelbase of the car 10 in the backward-motion control method according to an embodiment of the present invention. And the course of the backward-motion as shown in FIG. 8 and FIG. 9 is different from the course of the backward-motion as shown in FIG. 6 and FIG. 7.

As shown in FIG. 8, the car 10 repeats a backward movement and a forward movement many times when the car 10 is reversed in the parking area. However, the backward-motion control method according to an embodiment of the present invention as shown in FIG. 9 completes the parking without change of the course.

As the implementation described above, the first backward-motion control signal and the second backward-motion control signal is generated or converted in correspondence with the backward direction and the backward velocity of the car 10 or the trailer 30, as an example. Also, it is possible that the driver controls the backward velocity using a brake of the car 10 in state that the car 10 is driven by a constant velocity. For example, the first backward-motion control signal and the second backward-motion control signal comprises information about a steering angle, and the driver controls the velocity of the car 10 using the brake of the car 10. Also, information about the backward velocity of the first backward-motion control signal and the second backward-motion control signal comprises information about operation of the brake.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A car connected to at least one trailer comprising:
    a driving part controlling a velocity and a direction of the car;
    a backward-motion control terminal outputting a first backward-motion control signal corresponding to at least one of a backward velocity and a backward direction of the last trailer according to a user's operation;
    a control signal converter converting the first backward-motion control signal to a second backward-motion control signal which corresponds to at least one of a backward velocity and a backward direction of the car and makes the last trailer move backward as at least one of the backward velocity and the backward direction corresponding to the first backward-motion control signal; and
    a backward-motion controller controlling the driving part on the basis of the second backward-motion control signal so that the last trailer moves backward by at least one of the backward velocity and the backward direction corresponding to the first backward-motion controlling signal
    wherein the first backward-motion control signal comprises a first linear velocity and a first angular velocity for the last trailer,
    the second backward-motion control signal comprises a second linear velocity and a second angular velocity corresponding to a backward-motion of the car, and
    the control signal converter converts the first backward-motion control signal to the second backward-motion control signal by the following equation:

$$A \begin{bmatrix} (-1)^{n-1}\cos\Psi_n & (-1)^{n-1}d_{car}\sin\Psi_n \\ \frac{\sin\Psi_n}{d_{trailer}} & -\cos\Psi_n \end{bmatrix} \begin{bmatrix} v_0 \\ w_0 \end{bmatrix} = \begin{bmatrix} v_n \\ w_n \end{bmatrix}$$

$$A = \frac{1}{(-1)^{n-1}\left(\cos^2\Psi_n + \frac{d_{car}}{d_{trailer}}\sin^2\Psi_n\right)},$$

$$\Psi_i = \sum_{k=1}^{i} (-1)^{k-1}(\theta_{k-1} - \theta_k), i = 1, \dots, n$$

wherein $v_0$ is a linear velocity of the car, $W_0$ is an angular velocity of the car $v_n$ is a linear velocity of the nth trailer, $w_n$ is an angular velocity of the nth trailer, $\theta_i$ is a joint angle between the ith trailer and the i-1th trailer or between the car and the first trailer, $d_{car}$ is a length of a connecting link of the car, and $d_{trailer}$ is a length of a connecting link of the trailer.

2. The car connected to at least one trailer according to claim 1 further comprising an angle sensor measuring the joint angle; and
    wherein the control signal converter converts the first backward-motion control signal to the second backward-motion control signal on the basis of the joint angle measured by the angle sensor.

3. The car connected to at least one trailer according to claim 2 further comprising:
    a camera installed at the last trailer and capturing the rear of the last trailer; and
    a display part installed at the car and displaying an image captured by the camera.

4. The car connected to at least one trailer according to claim 2, wherein the backward-motion control terminal transmits the first backward-motion control signal by wireless.

5. The car connected to at least one trailer according to claim 2 further comprising a control mode selecting part selecting one of a backward-motion control mode and a forward-motion control mode;
    wherein the backward-motion controller controls the control signal converter to convert the first backward-motion control signal to the second backward-motion control signal and controls the driving part on the basis of the second backward-motion control signal so that the car moves backward, when the backward-motion control mode is selected by the control mode selecting part; and
    wherein the backward-motion controller prevents the control signal converter from the converting process for the first backward-motion control signal and controls the driving part on the basis of the first backward-motion control signal so that the car moves forward, when the forward-motion control mode is selected by the control mode selecting part.

6. A backward-motion control method of a car connected to at least one trailer, the method comprising:
    (a) inputting a first backward-motion control signal corresponding to at least one of a backward velocity and a backward direction of the last trailer;
    (b) converting the first backward-motion control signal to a second backward-motion control signal corresponding to at least one of a backward velocity and a backward direction of the car which makes the last trailer move backward as at least one of the backward velocity and the backward direction corresponding to the first backward-motion control signal; and
    (c) controlling the car to move backward on the basis of the second backward-motion control signal so that the last trailer moves backward at the backward velocity and/or the backward direction corresponding to the first backward-motion control signal
    wherein the first backward-motion control signal comprises a first linear velocity and a first angular velocity of the last trailer,
    the second backward-motion control signal comprises a second linear velocity and a second angular velocity for the last trailer, and
    the first backward motion controller signal is converted to the second backward-motion control signal in said step (b) by the following equation:

$$A \begin{bmatrix} (-1)^{n-1}\cos\Psi_n & (-1)^{n-1}d_{car}\sin\Psi_n \\ \dfrac{\sin\Psi_n}{d_{trailer}} & -\cos\Psi_n \end{bmatrix} \begin{bmatrix} v_0 \\ w_0 \end{bmatrix} = \begin{bmatrix} v_n \\ w_n \end{bmatrix}$$

$$A = \dfrac{1}{(-1)^{n-1}\left(\cos^2\Psi_n + \dfrac{d_{car}}{d_{trailer}}\sin^2\Psi_n\right)},$$

$$\Psi_i = \sum_{k=1}^{i} (-1)^{k-1}(\theta_{k-1} - \theta_k),\ i = 1, \ldots, n$$

wherein $v_0$ is a linear velocity of the car, $W_0$ is an angular velocity of the car $v_n$ is a linear velocity of the nth trailer, $w_n$ is an angular velocity of the nth trailer, $\theta_i$ is a joint angle between the ith trailer and the i-lth trailer or between the car and the first trailer, $d_{car}$ is a length of a connecting link of the car, and $d_{trailer}$ is a length of a connecting link of the trailer.

7. The backward-motion control method according to claim 6 further comprising:
   (d) measuring a joint angle of each trailer; and
   wherein the first backward-motion control signal is converted to the second backward-motion control signal in said step (b) on the basis of the measured joint angle.

8. The backward-motion control method according to claim 7 further comprising (e) selecting a backward-motion control mode or a forward-motion control mode;
   wherein said step (b) and said step (c) are performed, when the backward-motion control mode is selected in said step (e); and
   wherein the car is controlled to move forward on the basis of the first backward-motion control signal in the stat that said step (b) and said step (c) is prevented from being performed, when the forward-motion control mode is selected in said step (e).

\* \* \* \* \*